United States Patent [19]

Hosoya

[11] Patent Number: 4,802,267

[45] Date of Patent: Feb. 7, 1989

[54] METHOD AND APPARATUS FOR CONTROLLING RETRACTING SPEEDS OF INJECTION MOLDING MACHINES

[75] Inventor: Toshio Hosoya, Numazu, Japan

[73] Assignee: Toshiba Kikai Kabushiki Kaisha, Tokyo, Japan

[21] Appl. No.: 140,143

[22] Filed: Dec. 29, 1987

[30] Foreign Application Priority Data

Jan. 7, 1987 [JP] Japan ............. 62-1220

[51] Int. Cl.$^4$ ................ B29C 45/82
[52] U.S. Cl. ................ 425/135; 264/40.1; 425/145
[58] Field of Search ........ 264/40.1, 40.3, 40.5, 264/328.1; 425/145, 146, 147, 149, 135

[56] References Cited

U.S. PATENT DOCUMENTS

| | | |
|---|---|---|
| 3,693,946 | 9/1972 | Merritt ............. 425/145 |
| 3,825,235 | 7/1974 | Schwertfeger et al. ....... 425/145 |
| 3,857,658 | 12/1974 | Muzsnay ............. 425/145 |
| 4,511,319 | 4/1985 | Takoyama ............ 425/145 |
| 4,735,564 | 4/1988 | Sasaki et al. ........... 264/40.5 |

Primary Examiner—Jan H. Silbaugh
Assistant Examiner—Jill L. Heitbrink
Attorney, Agent, or Firm—Koda and Androlia

[57] ABSTRACT

In a method of controlling a charging speed of an injection molding machine, a molten resin is charged by accumulating the same in a space in a heated barrel and in front of a screw by rotating the screw, the screw is moved rearward by a back pressure produced by the accumulated resin, the screw retracting speed is detected, the detected retracting speed is compared with a reference speed, and the back pressure acting upon the screw is controlled such that the difference between the screw retracting speed and the reference speed will become zero.

1 Claim, 1 Drawing Sheet

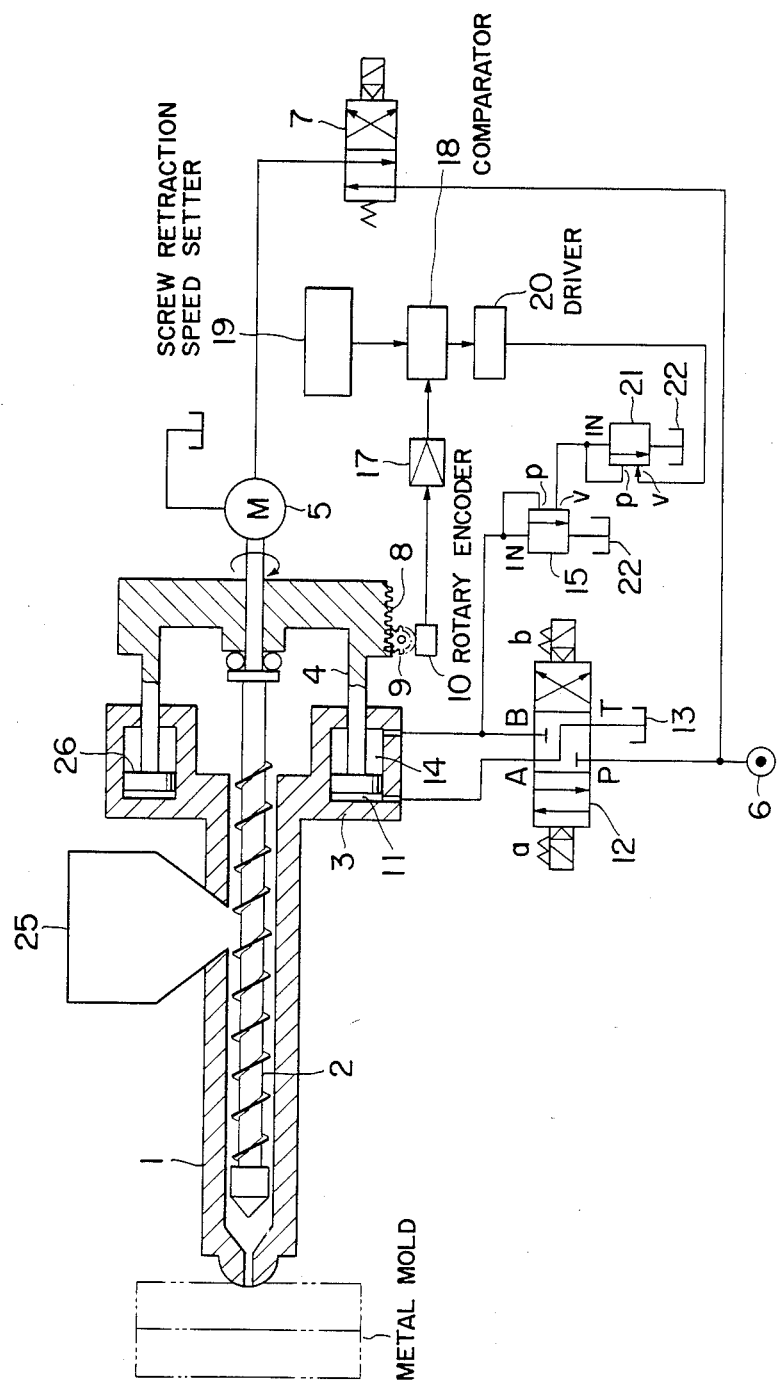

METHOD AND APPARATUS FOR CONTROLLING RETRACTING SPEEDS OF INJECTION MOLDING MACHINES

BACKGROUND OF THE INVENTION

This invention relates to a method and apparatus for controlling charging speeds of an injection molding machine.

Even when the number of revolutions of the screw of an injection molding machine is maintained at a constant value and even when the back pressure at the time of retracting the screw is maintained at a constant value, the quantity of resin accumulated in a space in front of the screw, the length to diameter ratio of the screw and the state of melting the resin vary from time to time due to a small change in particle diameter of a resin to be injected, a manufacturing lot, etc., thus changing the molten state of the resin. Consequently, the feed speed caused by the rotation of the screw varies more or less which results in the variation in the retracting speed of the screw. According to a prior art solution proposed to solve this problem, the retracting speed of the screw is detected by a detector, the detected speed is compared with a reference retraction speed preset in a setter and the number of revolutions of the screw is controlled so as to eliminate the difference between the detected speed and the reference speed thereby controlling the charging speed.

The resin plasticized in a barrel is melted by the heat transmitted from heating means provided for the barrel, and the shearing force imparted by the screw rotation and the amount of heat given to the resin are proportional to the stay time of the resin in the screw groove. However, the stay time of the resin injected in one lot is not always constant. Moreover, as the depth of the screw groove is not constant throughout the length of the screw, apparent heat conductivity varies from point to point thus rendering nonuniform the resin temperature. Moreover, the shearing force caused by the screw rotation also causes nonuniform the resin temperature because the shearing force becomes small as the degree of plasticization increases while the screw is retracted during which the effective length (a length between a resin hopper and the front end of the screw) decreases. Thus, according to the method described above wherein the resin charging speed is controlled by varying the number of revolutions of the screw, the shearing force or energy imparted to the resin varies. Consequently, all the molten resin in the screw groove is influenced by the variation in the shearing force thus failing to obtain uniform temperature and uniform kneading.

The purpose of control utilizing the screw back pressure is to vary the pressure in the screw groove at the front end thereof so as to improve the kneading effect caused by the flow of the resin in the groove due to back pressure. The inventor has found the fact that the back pressure has an influence on a limited quantity of the resin contained in the groove between the front end of the screw and a point a predetermined distance apart therefrom and that the charging speed can be efficiently controlled by controlling the back pressure.

SUMMARY OF THE INVENTION

It is an object of this invention to provide a novel method and apparatus for controlling the charging speed of an injection molding machine capable of making constant the resin charging time and hence making constant the heated state of the molten resin and the molding cycle at respective molding shot thereby to obtain molded products having stable and excellent quality by effecting a feedback control of the screw retracting speed at the time of plasticizing and charging the resin by using screw back pressure.

According to one aspect of this invention there is provided a method of controlling a charging speed of an injection molding machine comprising the steps of charging a molten resin by accumulating the molten resin in a space in a heated barrel and in front of a screw of the injection molding machine by rotating the screw, moving rearward the screw by a back pressure produced by the accumulated resin, detecting a screw retracting speed, comparing a detected screw retracting speed with a predetermined reference speed, and controlling the back pressure acting upon the screw such that the difference between the screw retracting speed and the reference speed will become zero.

According to another aspect of this invention there is provided apparatus for controlling a charging speed of an injection molding machine wherein a molten resin contained in a heated barrel is injected into a metal mold, the apparatus comprising: a screw contained in the heated barrel, means for rotating the screw, piston-cylinder means for reciprocating the screw in the heated barrel, pressurized oil transfer valve means for admitting and discharging pressurized oil into and from the cylinder, means operated by the piston for generating a signal representing a screw retraction speed, means for setting a reference screw retraction speed, and means responsive to a difference between the signal representing the screw retraction speed and the reference screw retraction speed for controlling the back pressure of the pressurized oil acting upon the rear surface of the piston.

BRIEF DESCRIPTION OF THE DRAWING

In the accompanying drawing, a single figure shows a preferred embodiment of the control apparatus according to this invention.

DESCRIPTION OF THE PREFERRED EMBODIMENT

An injection molding machine shown in the accompanying drawing comprises a barrel or a heating barrel 1 provided with heating means, not shown, a hopper 25 for supplying a thermoplastic resin to be injected, a screw 2 contained in the barrel 1, and an injection cylinder 3 connected to the rear end of the screw 2 and provided with a piston 4 for reciprocating the screw, the piston 4 being arranged to be subjected to a back pressure applied to the screw when it is retracted. A screw driving motor 5 is connected to the rear end of the screw 2 for rotating the same. In this example, the screw driving motor 5 takes the form of an oil pressure motor supplied with pressurized oil from a pump 6 through an electromagnetic transfer valve 7 of a conventional construction. A rack 8 is formed on the lower surface of the injection cylinder 4 for rotating a screw retracting speed detector 10, for example an encoder, through a pinion 9. A chamber 11 containing a piston 26 of the injection cylinder 3 is connected to a port A of an electromagnetic transfer valve 12 so that the chamber 11 would be connected to a drain tank 13 when the transfer valve is in its neutral position. A chamber 14 to the rear of the piston 26 is connected to port B of the transfer valve 12 and to a port IN and a pilot port P of a back pressure setting relief valve 15. When this valve 15 is actuated the pressurized oil in chamber 14 is discharged to a drain 22 through port IN. The vent port v of the relief valve 15 is connected to a port IN and a pilot port P of an electromagnetic control valve 21, and the vent port v of the control valve 21 is controlled by a signal outputted by driver 20 so as to variably control the oil pressure in chamber 14.

The output signal of the screw retraction speed detector 10 is applied to a comparator 18 via an amplifier 17, and an output signal of a screw retraction speed setter 19 is also applied to the comparator 18, the output signal thereof being applied to a driver 20 of the electromagnetic control valve 21.

More particularly, the valves 15 and 21 cooperate with each other such that the back pressure in chamber 14 could be changed in accordance with the setting of the screw retraction speed setter 19, for example from 50 kg/cm$^2$ to 100 kg/cm$^2$.

In operation, when charging a plasticized thermoplastic resin the electromagnetic transfer valve 7 is actuated so as to rotate the screw 2 by the oil pressure motor 5, while at the same time the electromagnetic transfer valve 12 is transferred to position A so that the molten resin is accumulated in a space in the barrel 1 in front of screw 2. Consequently, the screw 2 is moved rearward by the back pressure created by the accumulated molten resin, whereby the injection piston 4 of the injection cylinder 3 is also moved rearward. Then the rack 8 drives the screw retracting speed detector 10 to compare the detected speed with a target speed set in the screw retraction speed setter 19. When the compared speeds are not equal, the driver 20 operates the electromagnetic control valve 21 for controlling the back pressure acting to retract the screw such that the output signal of the comparator would become zero.

As above described, the screw is retracted at a predetermined speed preset in the screw retraction speed setter 19 whereby it is possible to complete charging of the molten resin in a predetermined time.

According to this invention since the screw retraction speed at the time of charging the plasticized resin is feedback controlled by using the screw back pressure, the charging time becomes constant so that the state of the molten resin and the molding cycle of respective shots are always the same thus enabling to mold products of high quality.

What is claimed is:

1. Apparatus for controlling a charging speed of injection molding machine wherein a molten resin contained in a heated barrel is injected into a metal mold, said apparatus comprising:

a screw contained in said heated barrel;

means for rotating said screw;

piston-cylinder means for reciprocating said screw in said heated barrel;

pressurized oil transfer valve means for admitting and discharging pressurized oil into and from said cylinder;

means operated by said piston for generating a signal representing a screw retraction speed;

means for setting a reference screw retraction speed; and means responsive to a difference between said signal representing the screw retraction speed and said reference screw retraction speed for controlling a back pressure of said pressurized oil acting upon a rear surface of said piston, said means comprising a back pressure setting relief valve connected between a chamber in said cylinder on a back side of said piston and a drain, said back pressure setting relief valve having a pilot port also connected to said chamber and a vent port, and an electromagnetic control valve having a port connected between the vent port of said back pressure setting relief valve and said drain and a vent port controlled by an output of a driver actuated by a difference between said signal representing said screw retraction speed and said reference screw retraction speed.

* * * * *